United States Patent [19]
Oketani et al.

[11] Patent Number: 5,481,944
[45] Date of Patent: Jan. 9, 1996

[54] INDEXING DEVICE

[75] Inventors: Tetsuya Oketani; Toshio Ito, both of Gifu, Japan

[73] Assignee: Howa Machinery, Ltd., Aichi, Japan

[21] Appl. No.: 217,250

[22] Filed: Mar. 24, 1994

[30] Foreign Application Priority Data

Mar. 29, 1993 [JP] Japan .................................. 5-095378

[51] Int. Cl.⁶ .................................................. B23Q 16/02
[52] U.S. Cl. .................................... 74/816; 74/813 C
[58] Field of Search ............................ 74/813 R, 813 C, 74/813 L, 815, 816, 577 M, 578

[56] References Cited

U.S. PATENT DOCUMENTS

| | | | |
|---|---|---|---|
| 3,724,291 | 4/1973 | Goebel | 74/815 |
| 5,297,454 | 3/1994 | Ito | 74/816 |

FOREIGN PATENT DOCUMENTS

| | | | |
|---|---|---|---|
| 4-348846 | 12/1992 | Japan | 74/813 R |
| 4-348847 | 12/1992 | Japan | 74/813 R |
| 4-348848 | 12/1992 | Japan | 74/813 R |

*Primary Examiner*—Rodney H. Bonck
*Attorney, Agent, or Firm*—Ladas & Parry

[57] ABSTRACT

An indexing device comprises an indexing table fixed to a table shaft rotatably supported on a body structure. A worm shaft is rotatably supported on the body structure and has a worm formed thereon. An indexing gear is fixed coaxially to the indexing table. The indexing device has a rotation correction device for stopping the rotation of the worm shaft prior to the indexing operation of the indexing table. The indexing device further has a positioning device for operating, after the worm shaft has been thus stopped, to impart a rotational torque to the indexing table and to cause a gear tooth face of the indexing gear to press against and hold a worm tooth face of the worm, whereby the precision of positioning of the indexing table is improved.

16 Claims, 7 Drawing Sheets

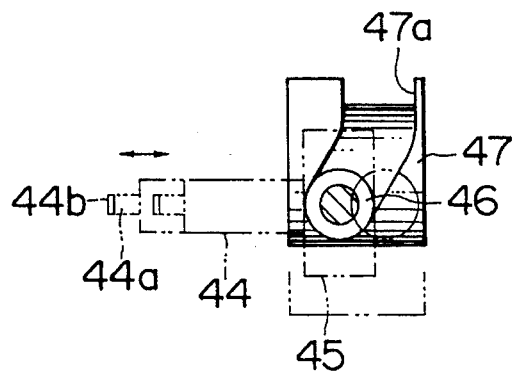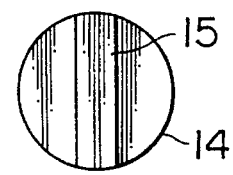
FIG. 6    FIG. 7
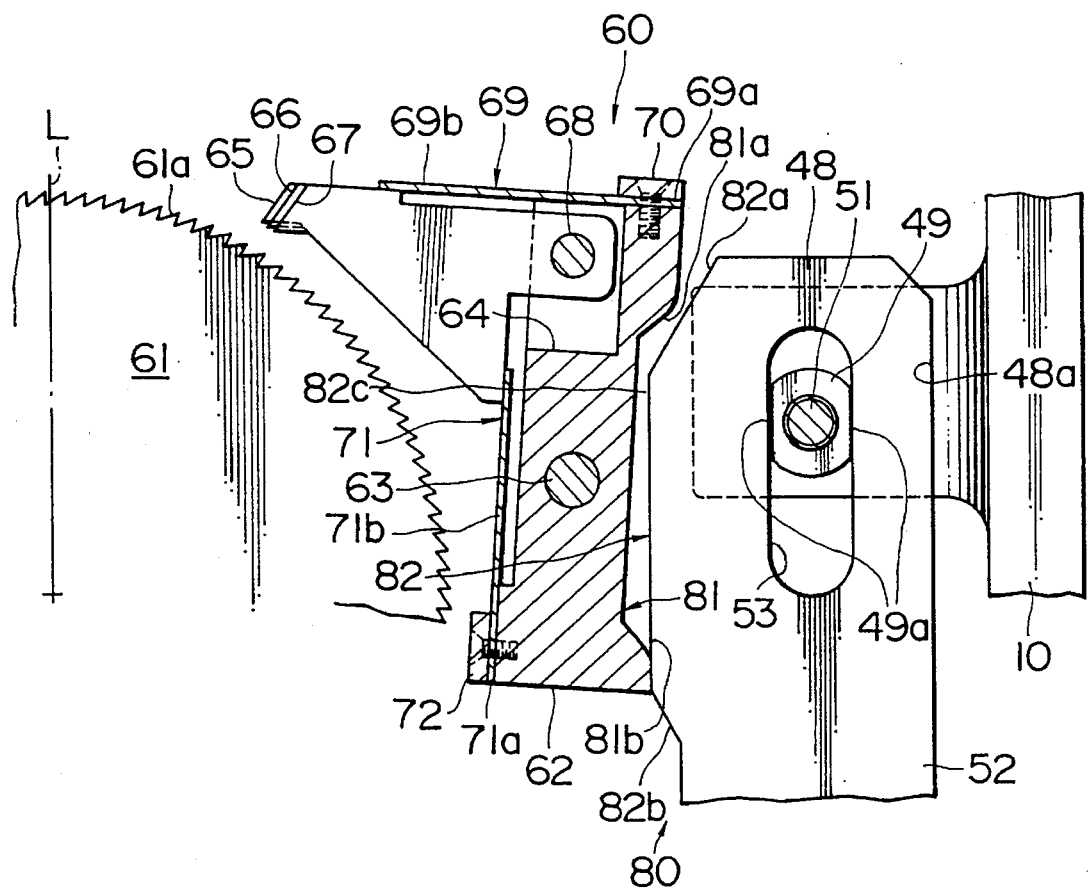
FIG. 8

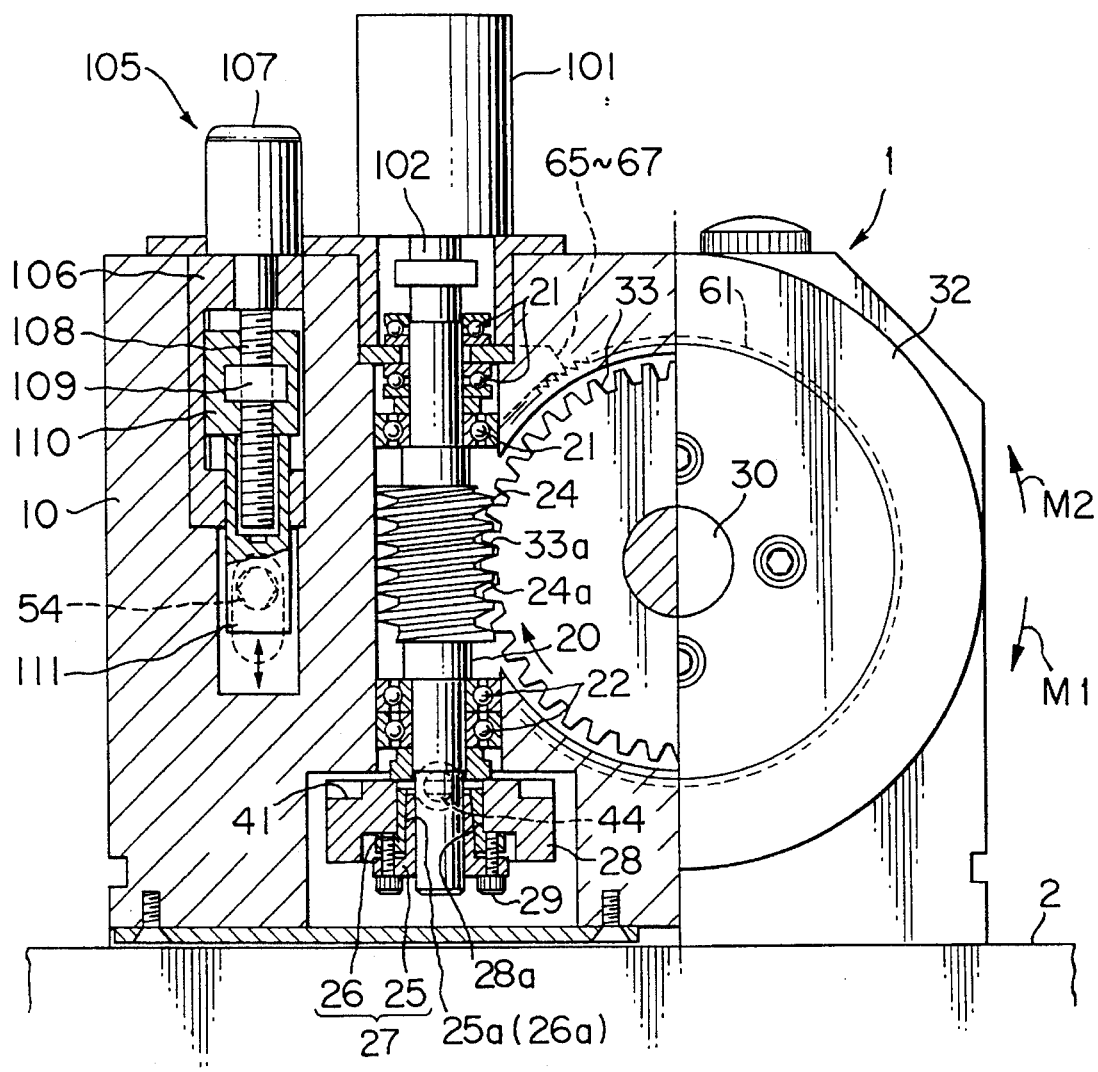
F I G. 12

INDEXING DEVICE

BACKGROUND OF THE INVENTION

The present invention relates generally to an indexing device which is mounted on a table or a pallet of a machine tool and the like and, more particularly, to an indexing device in which a worm gear mechanism is used.

One example of an indexing device of the above type is disclosed in U.S. Pat. No. 5,297,454 (corresponding to Japanese Patent Application Laid-Open Pub. No. 4-348,846 published Dec. 3, 1992). This indexing device accomplishes indexing by utilizing a known rigid tap function or synchronized tap function of the main drive spindle previously possessed by a machine tool (machining center). A clutch member mounted on the drive spindle of the machining center is engaged with a mating clutch member of an input shaft of the indexing device. First, with the synchronized tap function, the input shaft is rotated in its regular rotational direction as it is pushed in its axial direction. During regular rotation, a worm shaft is not rotated because of the functioning of a free-wheeling or one-way clutch provided between the input shaft and the worm shaft, whereby indexing is not carried out. When, after the drive spindle of the machining center stops, rotation in the reverse rotational direction is imparted to the drive spindle with the synchronized tap function, the worm shaft rotates, and an indexing table is driven in indexing rotation.

In this indexing device, after the worm shaft rotates, its rotation is stopped by a rotation correcting device. A positioning pin of a positioning shaft is mounted on the body structure of the indexing device in a slidable manner relative to meshing pawls of a clamp plate secured to the rear end of the table shaft of an indexing table. After the rotation has been stopped as above, the positioning pin is fitted in between the meshing pawls. In this manner positioning of the indexing table is accomplished, and at the same time any rotational moment applied to the indexing table during machining is countered.

Furthermore, in the rotation correcting device of the above described indexing device of the prior art, a driving gear is fixed to the lower end of the input shaft. This driving gear is meshed with a driven gear provided on the lower end of the worm shaft in a manner wherein the driven gear rotates unitarily with worm shaft but is slidable relative thereto in the axial direction. A triangular projection is provided on the upper end of this driven gear. A corresponding cut-out recess for engaging with and disengaging from this projection is formed in the body structure of the device. An axial shifting of the input shaft causes the driving gear to catch the driven gear and cause it to ascent along the worm shaft, thereby engaging and disengaging the projection and the cut-out recess. Thus the rotational advancing and retarding of the worm shaft due to the input shaft is corrected.

In the above described device, a positioning pin is fitted in between meshing pawls. In this mechanism, the positioning shaft is slidably fitted in the body structure. For this reason, abrasive wear occurs after a long period of service in the small sliding clearance between the body structure and the positioning shaft. Consequently, the positioning pin is apt to be inclined relative to the meshing pawls. This has given rise to the problem of a drop in the precision of positioning of the indexing table.

Furthermore, a single positioning pin fits in between the meshing pawls of the clamp plate. For this reason, when a finer indexing angle (for example, 1 degree) is sought, the sizes of the meshing pawls of the clamp plate and of the positioning pin become extremely small, whereby sufficient strength of these parts cannot be obtained, and their fabrication becomes very difficult if not impossible. Consequently there has been the problem of only indexing devices of relatively large indexing angles being available.

Further problems encountered in the case of the prior art indexing device are as follows. In the aforedescribed rotation correction device, the driven gear at the lower end of the worm shaft ascends and descends along the worm shaft and thus causes the projection to engage with and disengage from the cut-out recess in the body structure. For this reason, a large space for movement of the driven gear at the lower part of the worm gear becomes necessary. Consequently, the size of the entire indexing device in the worm shaft direction has tended to be large. Moreover, the input shaft together with the driving gear ascends and descends as it rotates with synchronized tap function, and the faces of the ends of the teeth of the driving gear cause the driven gear to ascend and descend in a state wherein they are in pressing contact with a plate provided on the driven gear. For this reason, the plate is easily worn by abrasion.

SUMMARY OF THE INVENTION

It is an object of the present invention to provide an indexing device provided with a positioning device which does not lower the precision of positioning of an indexing table.

Another object of this invention is to provide an indexing device provided with a positioning device which can realize a fine indexing angle.

A further object of the invention is to provide a rotation correcting device of the worm shaft which can reduce the size of the worm shaft in its axial direction thereby to provide an indexing device of miniaturized size.

For achieving the first mentioned object, the invention provides an indexing device in which a worm shaft is rotated thereby to cause an indexing table to undergo indexing rotation, and which comprises rotation correction means which, prior to positioning of the indexing table, stops the rotation of the worm shaft relative to the body structure of the indexing device, and positioning means operable after stoppage of the rotation of the worm shaft to impart rotational torque to the indexing table and to cause a gear tooth face of an indexing gear unitarily coaxial with the indexing table to press against and hold a worm gear face of a worm of the worm shaft.

For achieving the second mentioned object, the invention provides an indexing device which further comprises a ratchet wheel fixed unitarily to a table shaft of the indexing table and having a plurality of ratchet teeth formed with a specific angular spacing around the periphery of the ratchet wheel, a plurality of ratchet pawls swingably supported on a part of the body structure and adapted to engage with and disengage from the ratchet teeth, and ratchet pawl pressing means for pressing and holding the ratchet pawls against the ratchet teeth, the ratchet pawls, the ratchet wheel, and the ratchet pawl pressing means constituting positioning means, the ratchet pawl pressing means operating, after stoppage of the rotation of the worm shaft, to impart to the indexing table a rotational torque in one direction, the positioning means so operating that a single one of the ratchet pawls engages with the ratchet tooth indexed at a position obtained by equal division of the angular spacing of the ratchet teeth by the plural number of the ratchet pawls.

For achieving the third mentioned object, the invention provides an indexing device having rotation correcting means comprising a correction pin supported on the body structure to advance and retract in a direction perpendicular to the worm shaft and rotary engagement notches for correction provided around the periphery of a part of a driven gear coaxially fixed to the worm shaft, the correction pin functioning to engage with and retract from the engagement notches.

In the indexing device according to this invention, the worm shaft is rotated to rotate the indexing table by way of the indexing gear. Then the worm shaft is stopped from rotating relative to the body structure. Thereafter a rotational torque is imparted to the indexing table by the positioning means. The gear tooth face of the indexing gear is thereby caused to press against and hold the worm gear face of the worm shaft stopped from rotating thereby to accomplish positioning. In this manner the gear tooth face of the indexing gear is pressed against the precisely indexed worm tooth face. Thus, during positioning, no slippage occurs between the worm tooth face and the gear tooth face of the indexing gear. Therefore positioning with high precision on the referential basis of the worm shaft can be accomplished in contrast to a prior art device in which abrasive wear occurs after long use in the rubbing surfaces between a positioning pin and the body structure of the device.

In the indexing device according to this invention, furthermore, a single one of a plurality of ratchet pawls engages and presses against a ratchet tooth of the ratchet wheel fixedly mounted on the table shaft of the indexing table, the single one ratchet pawl thus engaging the ratchet tooth at a position that divides into equal divisions the angular spacing between the ratchet teeth. For this reason, even when the angular spacing between the ratchet teeth is increased to increase the strength of the teeth, positioning at fine indexing positions at intervals less than the angular spacing of the ratchet wheel teeth can be carried out.

Still another feature of the indexing device according to the invention is the provision of a correction pin disposed on the body structure perpendicular to the worm shaft and rotary engagement notches for correction in a rotary member perpendicular to and coaxial with the worm shaft, these engagement notches functioning to be engaged by the correction pin. For this reason a large space for movement of one end of the worm shaft becomes unnecessary in contrast to the known device in which a projecting member moves in the axial direction of the worm shaft. Therefore the size of the indexing device in the axial direction of the worm shaft can be reduced.

The nature and further features of the present invention will be more apparent from the following detailed description of a preferred embodiment thereof when read in conjunction with the accompanying drawings.

BRIEF DESCRIPTION OF THE DRAWINGS

FIG. 6 is a side view showing the shape of a cam groove;

FIG. 7 is a view in the direction of the arrow VII in FIG. 1 of an input shaft and a male clutch member;

FIG. 8 is an enlarged fragmentary view of a part of the view of FIG. 3;

FIG. 12 is a front view, with some parts shown in section, of an indexing device according to a modification.

DESCRIPTION OF THE PREFERRED EMBODIMENT

Figure 1:
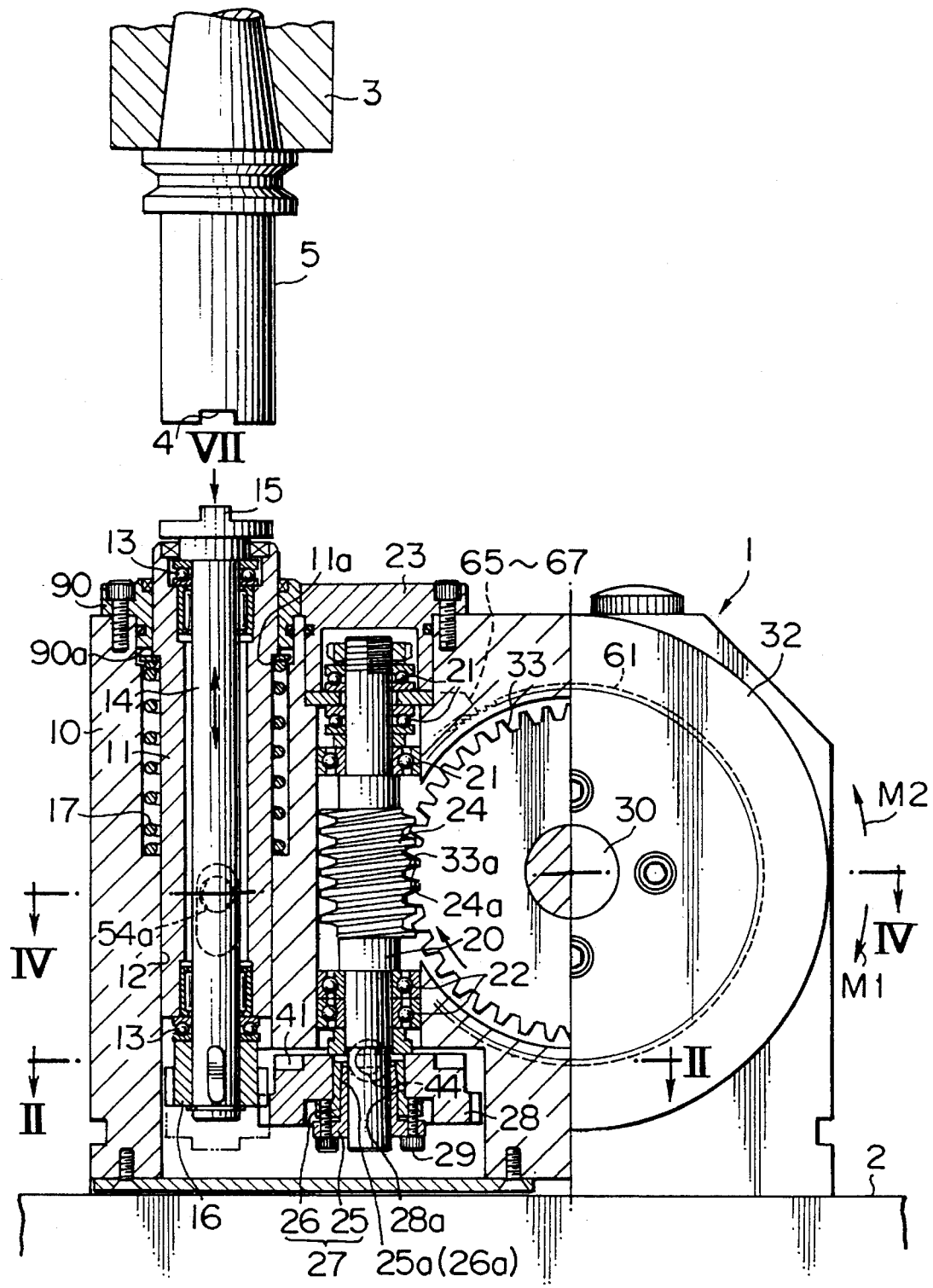
FIG. 1 is a front view, with some parts shown in section, of an indexing device constituting a preferred embodiment of the present invention.

An indexing device constituting a preferred embodiment of the present invention will now be described in detail with reference to the accompanying drawings. As shown in FIG. 1, the indexing device 1 of the invention is mounted on a working table 2 or a pallet of a machine tool of a machining center or the like. Above this indexing device 1, a reversible-rotation main drive spindle 3 is provided. This main spindle 3 is so supported that it can be positionally moved in the X-Y directions (horizontal directions) and in the Z direction (vertical direction) relative to the surface of the working table 2. A driving adapter 5 is detachably and coaxially attached to the lower end of the main spindle 3. This driving adapter 5 is provided at its lower end with a clutch member 4 for disengageably engaging with a mating clutch member 15 provided on the upper end of an input shaft 14, described hereinafter, of the indexing device 1. During a machining operation of the machining center on the working table 2, the adapter 5 is held in a specific position in a tool magazine. The machining center is provided with a control system (not shown) having the functional capability of controlling the rotational angle of the main spindle 3 of the machining center. Thus, at the time of indexing, the main spindle 3 is stopped by this control system at any desired angle that is an integral multiple of 90 degrees.

The indexing device 1 has a body structure 10 for supporting its essential operational parts. The body structure 10 is provided on one side thereof with a vertical through bore 12 as shown in FIG. 1. A support sleeve 11 is passed through the through bore 12 and is slidable therein in the vertical (axial) direction. The input shaft 14 is rotatably supported by way of upper and lower bearings 13 by and within the support sleeve 11. The upper end of the input shaft 14 projects upward through a sleeve cover 90 secured to the upper surface of the body structure 10. As described hereinbefore, a clutch member 15 (FIG. 7) having a protrusion for engaging a recess in the concave clutch member 4 is formed on the upper end of the input shaft 14. A driving gear 16 is coupled by keys to the lower end of the input shaft 14. The support sleeve 11 is provided at an upper part thereof with a stepped part 11a forming a downwardly facing ledge. A coil spring 17 is fitted around the support sleeve 11 and between the stepped part 11a and a ledge part of the body structure 10. The coil spring 17 is in compressed state and thereby exerts an upward spring force on the support sleeve 11. The stepped part 11a is positioned amply below the lowest surface 90a of the sleeve cover 90 when ratchet pawls 65, 66, and 67 are caused by the force of the spring 17 to mesh with a ratchet wheel 61 as described hereinafter.

A worm shaft 20 is supported in parallel with the input shaft 14 in the body structure 10 by way of upper and lower bearings 21 and 22 and a worm shaft cover 23. The worm shaft 20 is thus supported in a manner preventing its movement in the vertical (axial) direction but permitting its free rotation about its axis. The worm shaft 20 is provided at its middle part in its axial direction with a worm 24. A driven gear 28 is secured unitarily to the lower end of the worm shaft 20 by a gripping or tightening means 27 comprising an inner ring 25 and an outer ring 26. This driven gear 28 is meshed with the driving gear 16 on the input shaft 14. The gear ratio, driving gear:driven gear, is set at 1:2.25.

The tightening means 27 is provided with tightening bolts 29 by which it performs its tightening function in the following manner. When the tightening bolts 29 are tightened, i.e., screwed into respective tapped through holes in the outer ring 26, and the upper tips of the bolts 29 abut against a lower surface of the driven gear 28, the outer ring 26 is pulled downward and descends slightly as viewed in FIG. 1. Consequently, tapered surfaces 25a and 26a respectively of the inner ring 25 and the outer ring 26a slide against each other to produce a wedge action. This wedge action has the effect of pressing the outer peripheral surface of the outer ring 26 against the inner wall surface of the central hole 28a of the driven gear 28. Simultaneously, this wedge action has the effect of pressing inner surface of the inner ring against the outer peripheral surface of the worm shaft 20. As a result of these pressing forces, great frictional forces develop by which the worm shaft 20 and the driven gear 28 are unitarily tightened relative to each other.

By the use of this tightening means 27, fine adjustment of the relative rotational phase of the driven gear 28 and the rotational phase of the worm shaft 20 (which becomes also the rotational phase of an indexing table 32) becomes possible. This tightening means 27 is useful in the case where the rotation of the worm shaft 20 has been stopped by a correction device 40 (FIG. 2), described hereinafter, of the worm shaft 20, and where a workpiece held by a jig mounted on the indexing table 32 is not orientated in a specific correct direction relative to the drive spindle 3. In such a case, the tightening means 27 is untightened, and the angular position of the indexing table 32 is corrected.

Figure 4:
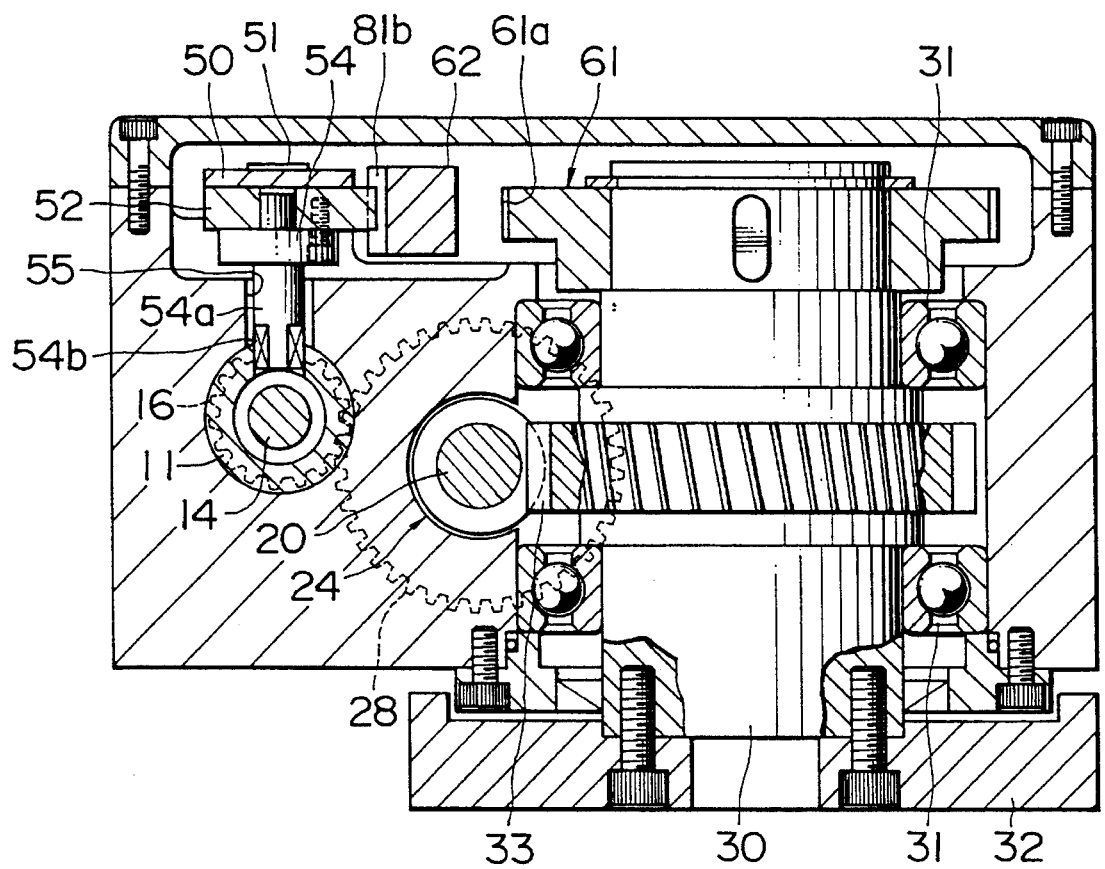
FIG. 4 is a sectional view taken in the plane indicated by line IV—IV in FIG. 1, as viewed in the arrow direction.

As shown in FIG. 4, a table shaft 30 is disposed on one side of the worm shaft 20 with an axial direction perpendicular to that of the worm shaft 20. This table shaft 30 is rotatably supported by front and rear bearings 31 on the body structure 10. The indexing table 32 is unitarily and coaxially fixed to the front end of this table shaft 30. An indexing gear 33 is unitarily and coaxially formed at and around a middle part of the table shaft 30 as considered in its axial direction. This indexing gear 33 is in the form of a worm wheel or a helical gear and is meshed with the aforedescribed worm 24 of the worm shaft 20 with mutually perpendicular axes. The speed-reduction ratio between the worm 24 and the indexing gear 33 is set at 1/40 in the instant embodiment. Therefore, when the input shaft 14 is rotated through 90 degrees, the indexing table 32 is indexed by 1 degree, resulting from the product of the gear ratio, 1:2.25, between the driving and driven gears 16 and 28 and the speed-reduction ratio 1/40 between the worm 24 and the indexing gear 33. Thus, in the instant embodiment, the minimum indexing unit is 1 degree.

Figure 2:
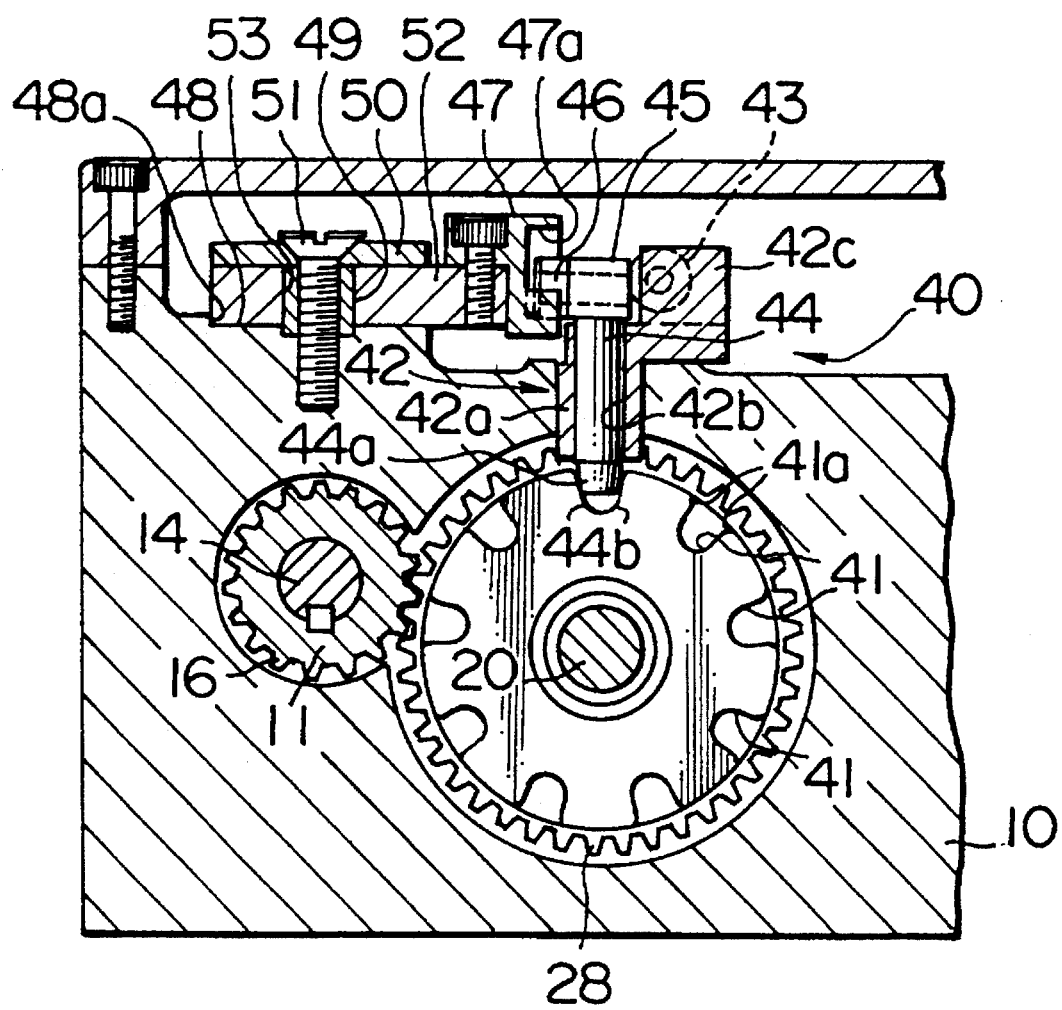
FIG. 2 is a sectional view taken in the plane indicated by line II—II in FIG. 1, as viewed in the arrow direction.

Next, the aforementioned rotation correction device 40 for correcting the rotation of the worm shaft 20 will be described. As shown in FIG. 2, nine (9) rotary engagement notches 41 for correction are formed in a circle at angular intervals of 40 degrees at the upper part of the above described driven gear 28. These engagement notches 41 lie in a plane perpendicular to the worm shaft 20 and have respective openings facing upward and radially outward. The angular spacing of 40 degrees of these engagement notches 41 results from the interrelation with the above mentioned speed-reduction ratio 1/40 between the driving and driven gears 16 and 28. The two rims at the entrance of the radially outwardly facing opening of each engagement notch 41 is chamfered as at 41a.

Figure 3:
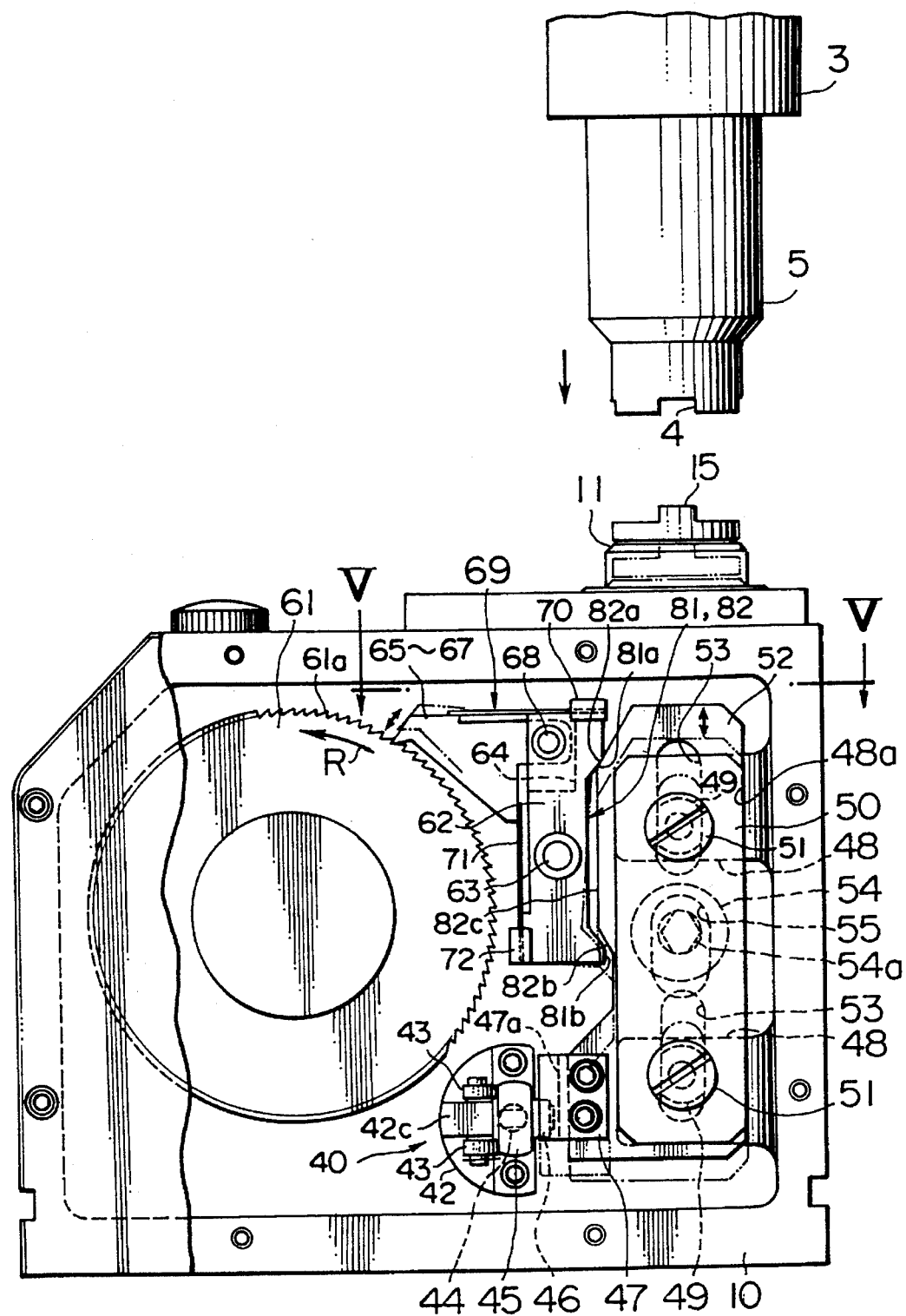
FIG. 3 is a rear view as opposed to the front view of FIG. 1.

As shown in FIGS. 2 and 3, a correction pin bracket 42 is fixedly mounted on the rear face of the body structure 10 at a lower part thereof at a height position to confront the engagement notches 41 of the driven gear 28. This correction pin bracket 42 has a guide sleeve 42a having a guide bore 42b directed toward the rotational axis of the worm shaft 20. Thus the axis of the guide bore 42b intersects perpendicularly the axis of the worm shaft 20. The correction pin bracket 42 is provided at the upper part of the guide bore 42b on one side thereof with a bulging wall 42c in the rearward direction. Above and below this bulging wall 42c, guide rollers 43 are rotatably supported to freely rotate about a vertical axis. A correction pin 44 is slidably fitted in the guide bore 42b and is thereby guided in slidable axial movement. At the tail end of this correction pin 44, a rotation preventing member 45 is unitarily fixed thereto. One side face of this rotation preventing member 45 is guided by the guide rollers 43 and functions to prevent rotation of the correction pin 44. The correction pin 44 at its forward working end has a fitting-in part 44a with upper and lower planar surfaces. The left and right sides of this fitting-in part 44 are chamfered surfaces 44b.

A cam follower 46 is fixed to a surface of the rotation preventing member 45 on its side opposite its side guided by the guide rollers 43. As indicated in FIG. 6, the cam follower 46 is fitted in a cam groove 47a of a cam member 47 secured to the lower end of a slider 52 constituting a part of a ratchet pawl pressing mechanism 80 (FIG. 8) described hereinafter. As shown also in FIGS. 2 and 3, the body structure 10 is provided at its rear face with upper and lower seats 48. Against these seats 48 a retaining plate 50 is secured by screws 51 over spacers 49 interposed therebetween. As shown in FIG. 3, the slider 52 has upper and lower slots 53 through which respective spacers 49 are passed. As shown in FIG. 8, each spacer 49 has left and right guide surfaces 49a in slidable contact with the left and right parallel straight sides of the slot 53 of the slider 52. The slider 52 is thus guided and, in this guided state, is slidably clamped between the retaining plate 50 and the seats 48.

As shown in FIGS. 3 and 4, a coupling member 54 is secured to the slider 52 at a position midway between its upper and lower slots 53. This coupling member 54 has a stem 54a extending horizontally through a slot 55 formed through a part of the body structure 10. The distal or forward end 54b of this stem part 54a of the coupling member 54 is fitted in the support sleeve 11 described hereinbefore. Prior to the indexing rotation of the worm shaft 20 in the operation of the indexing device, the support sleeve 11 is caused to descend against the force of the spring 17 together with the input shaft 14 by the drive spindle 3. As a result the slider 52 is caused to descend through the stem 54a, whereby the cam member 47 on the slider 52 acts on the cam follower 45 to move it rearward. The correction pin 44 is thereupon extracted out of the rotary engagement notch 41 in which it has been engaged. Then, after the worm shaft 20 has been driven in indexing rotation, the correction pin 44 fits into engagement with a rotary engagement notch 41 prior to a positioning action described hereinafter. The above described cam groove 47a is so shaped as to guide the cam follower 46 in its movement to bring about the above operation.

Thus the correction device 40 causes the correction pin 44 to advance and retract in a direction perpendicular to the worm shaft 20. In this correction device 40, a large space for movement in an axial end region of the worm shaft 20 is unnecessary, in contrast to the prior art device in which a projecting member is caused to move in the axial direction of the worm shaft 20. Furthermore, a plate which easily undergoes wear by abrasion as in the known device is eliminated, and labor for part change is also eliminated.

Figure 9A:
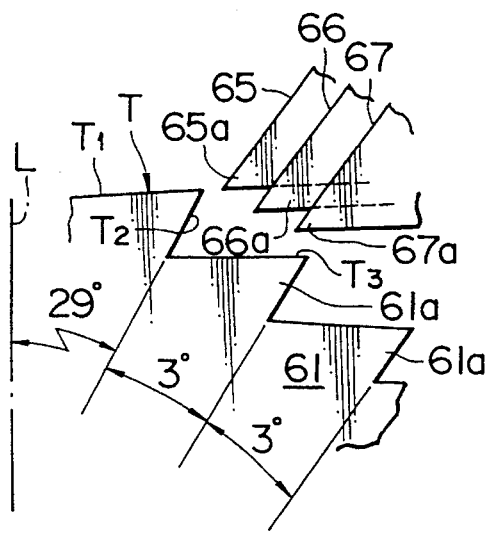
FIGS. 9A, 9B, 10A, 10B, 11A and 11B are schematic diagrams respectively indicating different phases of interaction between ratchet pawls and ratchet teeth of a ratchet wheel in the operation of the indexing device of the invention.

Next, a positioning device 60 (FIG. 8) of the indexing table 32 will be described. As shown in FIG. 4, the indexing table 32 is fixed coaxially to the front end of the table shaft 30. A ratchet wheel 61 is secured by a key on the rear end of the table shaft 30 and has a rear face protruding rearward from the body structure 10. The ratchet wheel 61 is provided around its periphery with 120 ratchet wheel teeth 61*a* in the instant embodiment. The angular spacing between adjacent ratchet teeth 61*a* is therefore 3 degrees as shown in FIG. 9A. As shown in FIG. 8, at the rear side of the body structure 10 and to one lateral side of the ratchet wheel 61, that is, between the ratchet wheel 61 and the aforedescribed slider 52, a ratchet pawl holder 62 is provided. This ratchet pawl holder 62 is rockably pivoted on a support pivot 63 and is thereby able to undergo rocking motion toward the ratchet wheel 61.

Figure 5:
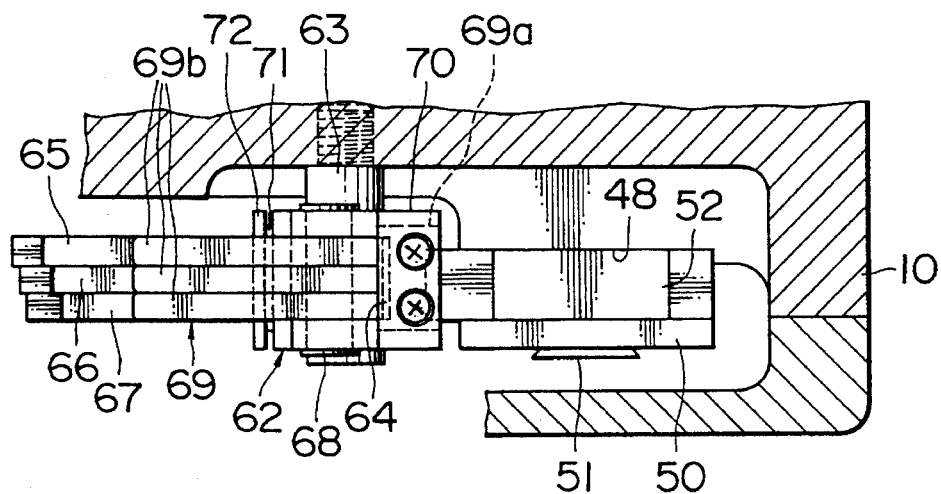
FIG. 5 is a sectional view taken in the plane indicated by line V—V in FIG. 3, as viewed in the arrow direction.

In a recess 64 at the upper part of the ratchet pawl holder 62, three ratchet pawls 65, 66, and 67 are rockably supported at their proximal parts by a rocking pin 68 fixed to the ratchet pawl holder 62. To the upper end of the ratchet pawl holder 62, a first pawl holding spring 69, made of a leaf spring, is fixed at its proximal end 69*a* by a fixing plate 70. This first pawl holding spring 69, at its portion extending forward from its proximal end 69*a* is divided, as indicated in FIG. 5, into three separate parts or tongues 69*b* respectively corresponding to the three ratchet pawls 65, 66, and 67. Each of the divided spring tongues 69*b* elastically presses downward on a corresponding one of the ratchet pawls 65, 66, and 67. Furthermore, as shown in FIG. 8, to the lower part of the side of the ratchet pawl holder 62 facing the ratchet wheel 61, a second pawl holding spring 71 is fixed at its proximal part 71*a* by a fixing plate 72 and extends upward. The part of this second pawl holding spring 71 thus extending upward from its proximal part 71*a* is split into three divisional parts 71*b* respectively corresponding to the three ratchet pawls 65, 66, and 67 similarly as in the case of the first pawl holding spring 69. The upper distal ends of the three divisional parts 71*b* are respectively in contact with downwardly extending parts of corresponding ratchet pawls 65, 66, and 67.

Figure 9B:
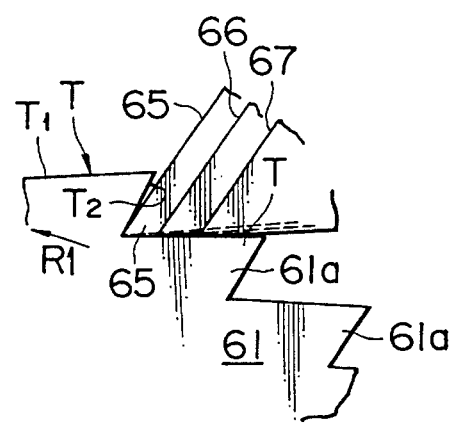
Figure 10A:
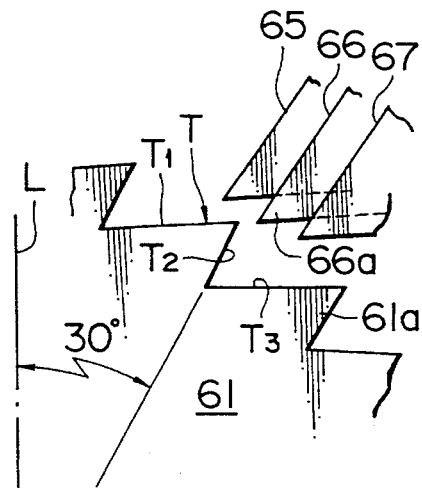
Figure 10B:
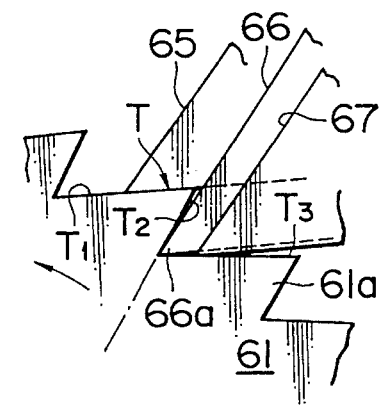

The ratchet pawls 65, 66, and 67 are thus in a state wherein they are supported elastically and rockably on the ratchet pawl holder 62 by the first and second pawl holding springs 69 and 71. With the ratchet pawls in this state, their distal tips 65*a*, 66*a*, and 67*a* are positioned, as shown in FIG. 9A, in the angular gap (3 degrees) between the ratchet teeth 61*a* of the ratchet wheel 61. In this embodiment, at the time of indexing, a ratchet wheel tooth 61*a* is indexed, as shown in FIG. 10A, at a position of an angle of 30 degrees relative to the vertical (plumb) centerline L of the ratchet wheel 61. (This ratchet wheel tooth 61*a* will be referred to as "engagement ratchet tooth T" to distinguish it from the other teeth.) The respective lengths and the shapes of the distal tips 65*a*, 66*a*, and 67*a* of the three pawls are so set that, with respect to the engaged ratchet tooth T, the following states are realized wherein phases are staggered in the circumferential direction relative to the ratchet wheel 61. At the above mentioned 30-degree position of FIG. 10A, the distal tip 66*a* of the middle pawl 66 meshes with the engaged ratchet tooth T as shown in FIG. 10B. At 1 degree therebefore (29 degrees of FIG. 9A), the distal tip 65*a* of the pawl 65 meshes with the same engagement ratchet tooth T as shown in FIG. 9B. At 1 degree thereafter (31 degrees of FIG. 11A), the distal tip 67*a* of the pawl 67 meshes with the engagement ratchet tooth T, as shown in FIG. 11B.

Next, the ratchet pawl pressing mechanism 80 in the positioning device 60 will be described. As shown in FIGS. 3 and 8, a cam 81 is formed on the surface of the ratchet pawl holder 62 facing the slider 52. This cam 81 comprises a pressing cam surface 81*a* formed at the upper part thereof and a release cam surface 81*b* formed at the lower part thereof. An actuating cam 82 is formed on the surface of the slider 52 facing the cam 81. This actuating cam 82 comprises a pressing-action cam surface 82*a* for engaging with and disengaging from the pressing cam surface 81*a*, a release-action cam surface 82*b* for engaging with and disengaging from the release cam surface 81*b*, and a release-holding cam surface 82*c* connecting the two cam surfaces 82*a* and 82*b*.

The cam 81 and the actuating cam 82 operate cooperatively in the following manner in the operation of the ratchet pawl pressing mechanism 80. As the slider 52 is caused by the main spindle 3 to descend, the correction pin 44 retracts. Simultaneously the release-action cam surface 82*b* of the slider 52 engages the release cam surface 81*b* to release the ratchet pawl 65 (66, 67) from its pressed state against the ratchet wheel 61. After the correction pin 44 advances (correction rotation), the slider 52 ascends. The pressing cam surface 81*a* is thereby engaged by the pressing-action cam surface 82*a* and actuated to move the pawl holder 62 in pivoting movement. The pawl 65 (66, 67) is thereby pressed toward the ratchet teeth 61*a* of the ratchet wheel 61. This pressed state of the pawl 65 (66, 67) is sustained by the spring force of the spring 17 until the succeeding releasing action.

When a need for indexing arises during work machining in the machining center, the aforementioned driving adapter 5 is mounted on the drive spindle 3 by a tool changing device. Then the following procedure is carried out. First the drive spindle 3 is moved in the X-Y (horizontal) plane until it is directly (coaxially) above the input shaft 14. The drive spindle 3 is then lowered in the Z direction (vertically) to mesh the clutch part 4 of the driving adapter 5 with the clutch member 15 of the input shaft 14. The drive spindle 3 is lowered further to cause the input shaft 14 to descend by a specific distance, together with the support sleeve 11, countering the spring force of the spring 17. As a consequence of this descent of the support sleeve 11, the slider 52 descends from its position indicated by solid line in FIG. 3 to its position indicated in FIG. 8. Together with this movement, the cam member 47 descends, whereby its cam groove 47*a* guides the cam follower 46. Thus the correction pin 44, which had been in a fitted state is retracted, and its fitting-in part 44*a* is extracted from the rotary engagement notch 41 in which it had been fitted. Thus the driven gear 28 is released from its locked state.

Simultaneously, the release action cam surface 82*b* engages with the release cam surface 81*b* and causes the ratchet pawl holder 62 to pivot about the support pivot 63 in the clockwise direction as viewed in FIGS. 3 and 8. Thus, as shown in FIG. 8, the engagement ratchet tooth is released from its state of being pressed by the pawl 65 (66, 67). The configurational patterns in which each of the pawls 65, 66, and 67 are each pressed against the surface $T_2$ of the engagement ratchet tooth T are as shown in FIGS. 9B, 10B, and 11B, respectively. When the pawl 65 (66, 67) in one of these pressed states is swung in the clockwise direction by the pivoting of the pawl holder 62 and disengages from the engaged ratchet tooth T, the pawls 65, 66, and 67 cause the second pawl holding spring 71 to deflect, if the engagement ratchet tooth T and the pawls 65, 66, and 67 interfere. In the case of such an interference, the pawls 65, 66, and 67 thus swing slightly in the counter-clockwise direction about the pin 68. Therefore these pawls 65, 66, and 67 disengage reliably from the engagement ratchet tooth T.

Next, the drive spindle 3, in its state of having pushed the input shaft inward, is rotated through an integral-number multiple of 90 degrees of angle by the drive spindle rotational angle control system. In the case where the indexing table 32 is to undergo 30 degrees of indexing rotation from its present position, the drive spindle 3 rotated through 7.5 revolutions. This rotation is transmitted through the clutch 4 and 15 to rotate the input shaft 14 through 7.5 revolutions. This rotation is further transmitted through the driving gear 16 and the driven gear 28. The worm shaft 20 thereby rotates 1/2.25 thereof. This rotation is further transmitted through the worm 24 and the indexing gear 33. Thus the indexing table 32 is thereby rotated a further 1/40 thereof, that is, 30 degrees of indexing rotation.

However, there is an inevitable error in the rotational control of the drive spindle 3. This gives rise to an advance or retardation in the rotation of the worm shaft 20, whereby one of the rotary engagement notches for correction does not confront the correction pin 44 correctly. Consequently, a slight deviation occurs in the circumferential direction. Then, when the drive spindle 3 ascends and separates away from the input shaft 14 after the indexing rotation of the worm shaft 20, the input shaft 14, together with the support sleeve 11, is raised by the force of the spring 17. The slider 52 thereby ascends, and the cam follower 46 is guided by the cam groove 47a. Accordingly, the fitting-in part 44a of the correction pin 44 is fitted into a rotary engagement notch 41 for correction. At the start of this fitting in, the chamfered part 41a of the engagement notch 41, conforming to the chamfered portion 44b of the fitting-in part 44a, causes the driven gear 28, that is, the worm shaft 20 to undergo corrective rotation to the correct indexing position and stops its rotation. As a result of this corrective rotation, the indexing table 32 is also correctively rotated and reaches its position to which it has correctly rotated 30 degrees. The ratchet tooth 61a which was on the line L prior to indexing is accurately positioned at the position shown in FIG. 10A, becoming the engagement ratchet tooth T.

In this manner the corrective rotation and stopping thereof of the worm shaft 20 is carried out. Immediately thereafter in timing, the pressing-action cam surface 82a of the ascending slider 52 engages the pressing cam surface 81a of the pawl holder 62. The pawl holder 62 is thereby pivoted, together with the pawls 65, 66, and 67, toward the ratchet wheel 61. The state of the pawls and the ratchet wheel during this pivoting movement immediately before pressing is indicated in FIG. 10A. At this time, the distal tip 66a of the pawl 66 is positioned immediately in front of an engagement surface $T_2$ in the radial direction of the engagement ratchet tooth T. The distal tip 65a of the pawl 65 is above the opposite surface $T_1$ of the engagement ratchet tooth T. Then, when the pawl holder 62 is further pivoted in the counter-clockwise direction by the spring force of the spring 17, the distal tip 66a of the pawl 66 meshes with the engagement ratchet tooth T and is pressed thereagainst by the first pawl holding spring 69. The other pawls 65 and 66, which did not mesh, are held by the first pawl holding spring 69 respectively above the surface $T_1$ and above the surface $T_3$ of the next ratchet tooth 61a.

In this manner the pawl 66 meshed with the tooth T of the ratchet wheel 61, acting under the force of the spring 17, imparts a rotational torque to the ratchet wheel 61 in the arrow direction R shown in FIG. 3. As a result, the gear tooth face 33a of the indexing gear 33 is pressed against the worm tooth face 24a of the worm 24 as shown in FIG. 1, thereby positioning the indexing table 32. The worm 24 is thus locked against rotation. Moreover, the indexing position is accurately corrected. Because the indexing gear 33 is pressed against this worm tooth face 24a (FIG. 1), there is no sliding or rubbing between the worm tooth face 24a and the gear tooth face 33a at the time of positioning. Thus, even if there is some abrasive wear of the distal tips of the pawls 65, 66, and 67, high precision positioning on the basis of the worm shaft 20 as a datum can be carried out.

Next, a case will be considered where the indexing table 32 is returned 1 degree from the state indicated in FIG. 10A by the rotation of the input shaft 14. In this case, the engagement ratchet tooth T assumes an indexing position forming an angle of 29 degrees with the vertical line L as shown in FIG. 9A. At this time, the distal tip 65a of the pawl 65 is at its nearest position to the surface $T_2$. When the pawl holder 62 is pivoted in the counter-clockwise direction by the ascent of the slider 52 as described hereinbefore, the pawl 65 meshes with the engagement ratchet tooth T to impart a rotational torque in the arrow direction R1 (FIG. 9B) to the ratchet wheel 61 and to maintain this state. Thus the gear tooth face 33a of the indexing gear 33 is pressed against the worm tooth face 24a, thereby accomplishing positioning. The remaining pawls 66 and 67 which are not meshed are pressed against the surface $T_3$ by the pawl holding spring 69.

Figure 11A:
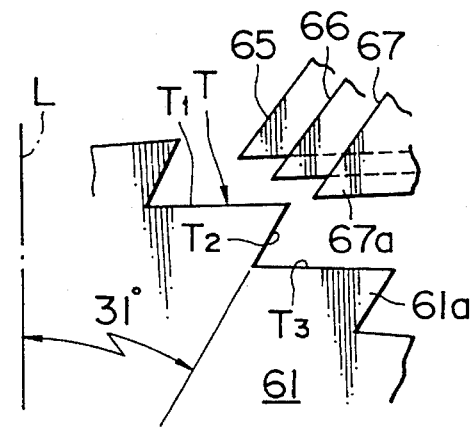
Figure 11B:
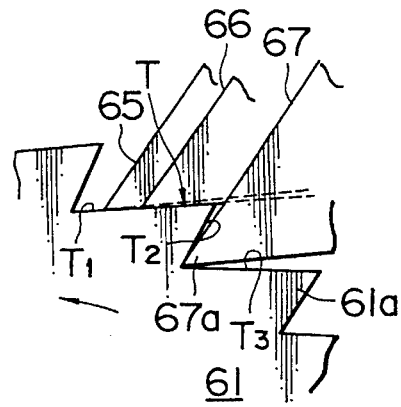

When the indexing table 32 is advanced 1 degree from the state indicated in FIG. 10A, the engagement ratchet tooth T assumes an indexing position at 31 degrees relative to the plumb line L as shown in FIG. 11A. At this time, the distal tip 67a of the pawl 67 is at its position closest to the surface $T_2$. As a result of the pivoting of the pawl holder 62, the pawl 67 meshes with the engagement ratchet tooth T. The pawl 67 then imparts a rotational torque in the arrow direction R2 to the ratchet wheel 61. Thus positioning is accomplished. The pawls 65 and 66 which did not mesh are pressed against the surface $T_1$.

Thus, in the indexing device of this invention, positioning for indexing is possible at positions obtained by dividing into still finer divisions the angular spacing in the circumferential direction of the ratchet teeth 61a formed around a ratchet wheel 61. Therefore the angular spacing between the ratchet teeth 61a can be increased to increase their strength. Furthermore the fabrication of the ratchet teeth can be facilitated.

During its operation in machining, the indexing table 32 positioned in the above described manner is subjected to moments about its table shaft 30 due to the machining operation. However, a moment in the arrow direction $M_1$ in FIG. 1 is borne by the worm tooth face 24a since the gear tooth face 33a of the indexing gear 33 presses against the worm tooth face 24a of the worm 24. On the other hand, when a moment $M_2$ in the opposite direction is imparted, this moment is transmitted through a ratchet tooth 61a, the pawls 65, 66, and 67, the pin 68, the pressing cam surface 81a, the pressing action cam surface 82a, and the slider 52 and is borne by side walls 48a (FIG. 2) of the seats 48.

In the embodiment of the invention described above, three ratchet pawls function one at a time. This invention, however, is not limited to this feature. As long as a single pawl meshes with a ratchet tooth, the device will operate satisfactorily. Furthermore, in this embodiment, three pawls are used, and the angular spacing between the ratchet teeth is set at 3 degrees thereby to obtain a minimum indexing angle of 1 degree. However, the number of pawls may be increased, and the angular spacing between the ratchet increased. In this embodiment, moreover, the worm shaft is driven in indexing rotation by way of an input shaft, but the upper end of the worm shaft may be extended outside of the body structure, and this externally extending part of the worm shaft may be provided with a clutch.

A further possible modification is an arrangement wherein the indexing device itself has a motor for indexing by which the worm shaft is driven in indexing rotation. This modification is shown in FIG. 12, in which the body structure is shown at 10 and has mounted thereon an indexing motor 101 having a rotary shaft 102. The shaft 102 is coupled to an end of a worm shaft 20 so that the indexing table 32 can be rotated by the motor 101. The body structure 10 carries an electric drive means 105 for shifting the correction pin 44. The drive means is an electric motor 107 having an output screw shaft 108 which is in screw engagement with a nut 109. The nut 109 is held by a slide member 110 shiftable along a guide 106. The slide member 110 is connected to a slider rod 111 that is connected to the coupling member 54 shown and described before with reference to FIG. 4.

According to the present invention as described above, a worm shaft is rotated to rotate an indexing table by way of an indexing gear. Then the rotation of the worm shaft is stopped, and a rotational torque is imparted to the indexing table by means of a positioning device, whereby a gear tooth face of the indexing gear is pressed against and holds the worm tooth face of the worm shaft thus stopped in rotation. For this reason, in comparison with an indexing device of a sliding positioning pin type, there is no abrasive wear due to sliding motion between the worm teeth and indexing gear teeth. As a result, high-precision positioning based on the worm shaft over a long period becomes possible.

According to this invention, furthermore, a single one of a plurality of ratchet pawls supported on the body structure of the indexing device meshes with and presses against a ratchet tooth of a ratchet wheel at positions which divide into equal divisions the angular spacing between the ratchet teeth of the ratchet wheel which is mounted on the table shaft of an indexing table. Therefore even when the angular spacing between the ratchet teeth is increased for imparting strength, positioning at fine indexing positions with spacing less than the angular spacing between the ratchet teeth can be accomplished.

Still another feature of this invention is that a correction pin perpendicular to the worm shaft is slidably supported on a part of the body structure and is adapted to engage with and retract out of one of a plurality of rotary engagement notches for correction formed radially around a part of the driven gear on a circle perpendicular to the worm shaft. By this feature, in comparison with an indexing device in which a projection member moves in the axial direction of the worm shaft, a large clearance space for movement of an end part of the worm shaft becomes unnecessary, and the size of the indexing device in the worm shaft direction can be reduced. Thus the entire indexing device can be miniaturized.

What is claimed is:

1. An indexing device comprising:

a body structure for supporting components of the device;

a table shaft rotatably supported on the body structure;

an indexing table fixed coaxially to the table shaft;

a worm shaft having a worm formed thereon and rotatably supported perpendicularly to the stable shaft on the body structure;

an indexing gear secured coaxially and unitarily to the indexing table and meshed with said worm;

an input shaft supported rotatably and movably in the axial direction thereof in the body structure and coupled via meshed gears to the worm shaft;

clutch means for disengageably coupling a drive spindle of a machine tool to the input shaft thereby to transmit rotation of the drive spindle via the input shaft and the worm shaft to drive the indexing table in indexing rotation;

correction means operable, prior to positioning of the indexing table, to temporarily stop the rotation of the worm shaft relative to the body structure; and positioning means including rotary motion imparting means for imparting a rotational torque to the indexing table, after the worm shaft has been temporarily stopped, and for causing a gear tooth face of the indexing gear to press against and hold a worm tooth face of the worm.

2. An indexing device as claimed in claim 1, wherein said rotary motion imparting means comprises a rotary member coaxially fixed with respect to the indexing table, said rotary member having a periphery with a plurality of rotary engagement notches, ratchet pawl means for selectively engaging said notches and means for rocking said ratchet pawl means when the latter engages said notches in the rotary member to rotate the rotary member and the indexing table.

3. An indexing device comprising:

a body structure;

a table shaft rotatably mounted on the body structure;

an indexing table fixed coaxially to the table shaft;

a worm shaft rotatably supported on the body structure and having a worm formed thereon;

an indexing gear secured coaxially and unitarily to the indexing table and meshed with the worm;

means for rotating the worm shaft thereby to cause the indexing table to undergo indexing rotation;

rotation correction means for temporarily stopping the rotation of the worm shaft prior to the indexing operation of the indexing table; and positioning means including rotary motion imparting means for imparting a rotational torque to the indexing table, after the worm shaft has been temporarily stopped, and for causing a gear tooth face of the indexing gear to press against and hold a worm tooth face of the worm.

4. An indexing device comprising:

a body structure for supporting components of the device;

a table shaft rotatably supported on the body structure;

an indexing table fixed coaxially to the table shaft;

a worm shaft having a worm formed thereon and rotatably supported perpendicularly to the table shaft on the body structure;

an indexing gear secured coaxially and unitarily to the indexing table and meshed with said worm;

an input shaft supported rotatably and movably in the axial direction thereof in the body structure and coupled via meshed gears to the worm shaft;

clutch means for disengageably coupling a drive spindle of a machine tool to the input shaft thereby to transmit rotation of the drive spindle via the input shaft and the worm shaft to drive the indexing table in indexing rotation;

correction means operable, prior to positioning of the indexing table, to temporarily stop the rotation of the worm shaft relative to the body structure; and positioning means operable, after the stopping of the rotation of the worm shaft, to impart a rotational torque to the indexing table thereby to cause a gear tooth face of the indexing gear to press against and hold a worm tooth face of the worm, said positioning means comprising:
- a ratchet wheel having a plurality of ratchet teeth formed therearound and fixed coaxially and unitarily to the table shaft;
- ratchet pawl means for disengageably engaging with the ratchet teeth;
- a ratchet pawl holder pivotally supported on the body structure and supporting the ratchet pawl means, which can thereby be swung into engagement with or out of engagement from the ratchet teeth; and
- ratchet pawl pressing means operable, after the worm shaft has stopped rotating, to actuate the ratchet pawl means to press against and hold a ratchet tooth of the ratchet wheel thereby to impart a rotational torque in one direction to the indexing table.

5. An indexing device according to claim 4, wherein the ratchet pawl pressing means comprises:
- driven cam surface means formed on a part of the ratchet pawl holder;
- a slider slidably supported by the body structure and coupled to the input shaft for sliding movement together with the input shaft; and
- pressing-action cam means formed on a part of the slider and being operable to press said driven cam surface means when the slider is driven in sliding movement by the axial movement of the input shaft which is caused by the drive spindle, whereby the ratchet pawl means supported on the ratchet pawl holder are pressed against the ratchet teeth.

6. An indexing device according to claim 5, further comprising:
- second driven cam surface means formed on another part of the ratchet pawl holder; and
- a release-action cam means formed on another part of the slider and being operable to press said second driven cam surface means, when the slider is driven in sliding movement by an axial movement of the input shaft in a reverse direction, in a manner to move the ratchet pawl means away from the ratchet teeth.

7. An indexing device according to claim 4, wherein said ratchet pawl means is pivotally mounted on the ratchet pawl holder.

8. An indexing device according to claim 7, wherein said ratchet pawl means is elastically held by pawl holding springs interposed between the ratchet pawl means and the ratchet pawl holder.

9. An indexing device according to claim 4, wherein said ratchet pawl means comprises a plurality of ratchet pawls, and the ratchet teeth are formed around the ratchet wheel at constant intervals of a specific angular spacing, and wherein a single one of the plurality of ratchet pawls is adapted to engage with a ratchet tooth which has been indexed at a position determined by equally dividing said angular spacing by the total number of ratchet pawls.

10. An indexing device comprising:
- a body structure for supporting components of the device;
- a table shaft rotatably supported on the body structure;
- an indexing table fixed coaxially to the table shaft;
- a worm shaft having a worm formed thereon and rotatably supported perpendicularly to the table shaft on the body structure;
- an indexing gear secured coaxially and unitarily to the indexing table and meshed with said worm;
- an input shaft supported rotatably and movably in the axial direction thereof in the body structure and coupled via meshed gears to the worm shaft;
- clutch means for disengageably coupling a drive spindle of a machine tool to the input shaft thereby to transmit rotation of the drive spindle via the input shaft and the worm shaft to drive the indexing table in indexing rotation;
- rotation correction means operable, prior to positioning of the indexing table, to temporarily stop the rotation of the worm shaft relative to the body structure, said correction means comprising a correction pin supported in the body structure to advance and retract in the axial direction thereof perpendicular to the worm shaft, and a rotary member fixed coaxially and unitarily to the worm shaft and having a plurality of rotary engagement notches for correction formed therearound in a circle perpendicular to the worm shaft and each functioning to be engaged and disengaged by the correction pin; and
- positioning means operable, after the stopping of the rotation of the worm shaft, to impart a rotational torque to the indexing table thereby to cause a gear tooth face of the indexing gear to press against and hold a worm tooth face of the worm.

11. An indexing device comprising:
- a body structure;
- a table shaft rotatably mounted on the body structure;
- an indexing table fixed coaxially to the table shaft;
- a worm shaft rotatably supported on the body structure and having a worm formed thereon;
- an indexing gear secured coaxially and unitarily to the indexing table and meshed with the worm;
- means for rotating the worm shaft thereby to cause the indexing table to undergo indexing rotation;
- rotation correction means for temporarily stopping the rotation of the worm shaft prior to the indexing operation of the indexing table; and
- positioning means for operating, after the worm shaft has been thus stopped, to impart a rotational torque to the indexing table and to cause a gear tooth face of the indexing gear to press against and hold a worm tooth face of the worm, said positioning means including;
  - a ratchet wheel having a plurality of ratchet teeth formed therearound and fixed coaxially and unitarily to the table shaft;
  - ratchet pawl means for disengageably engaging the ratchet teeth;
  - a ratchet pawl holder pivotally supported on the body structure and supporting the ratchet pawl means, which can thereby be swung into engagement with or out of engagement from the ratchet teeth; and
  - ratchet pawl pressing means operable, after the worm shaft has been stopped rotating, to actuate the ratchet pawl means to press against and hold a ratchet tooth of the ratchet wheel thereby to impart a rotational torque in one direction to the indexing table.

12. An indexing device according to claim 11, wherein the ratchet pawl pressing means comprises:
- driven cam surface means formed on a part of the ratchet pawl holder;
- a slider slidably supported by the body structure for being slidingly driven by drive means; and
- pressing-action cam means formed on a part of the slider and being operable to press said driven cam surface means when the slider is driven in sliding movement, whereby the ratchet pawl means supported on the ratchet pawl holder are pressed against the ratchet teeth.

13. An indexing device according to claim 12, further comprising:

second driven cam surface means formed on another part of the ratchet pawl holder; and a release-action cam means formed on another part of the slider and being operable to press said second driven cam surface means, when the slider is driven in sliding movement in a reverse direction, in a manner to move the ratchet pawl means away from the ratchet teeth.

14. An indexing device according to claim 11, wherein said ratchet pawl means is pivotally mounted on the ratchet pawl holder, and the ratchet pawl means is elastically held by pawl holding springs interposed between the ratchet pawl means and the ratchet pawl holder.

15. An indexing device according to claim 11, wherein said ratchet pawl means comprises a plurality of ratchet pawls, and the ratchet teeth are formed around the ratchet wheel at constant intervals of a specific angular spacing, and wherein a single one of the plurality of ratchet pawls is adapted to engage with a ratchet tooth which has been indexed at a position determined by equally dividing said angular spacing by the total number of ratchet pawls.

16. An indexing device comprising:

a body structure;

a table shaft rotatably mounted on the body structure;

an indexing table fixed coaxially to the table shaft;

a worm shaft rotatably supported on the body structure and having a worm formed thereon;

an indexing gear secured coaxially and unitarily to the indexing table and meshed with the worm;

means for rotating the worm shaft thereby to cause the indexing table to undergo indexing rotation;

rotation correction means for temporarily stopping the rotation of the worm shaft prior to the indexing operation of the indexing table, said correction means including a correction pin supported in the body structure to advance and retract in the axial direction thereof perpendicular to the worm shaft, and a rotary member fixed coaxially and unitarily to the worm shaft and having a plurality of rotary engagement notches for correction formed therearound in a circle perpendicular to the worm shaft and each functioning to be engaged and disengaged by the correction pin; and positioning means for operating, after the worm shaft has been thus stopped, to impart a rotational torque to the indexing table and to cause a gear tooth face of the indexing gear to press against and hold a worm tooth face of the worm.

* * * * *